(12) United States Patent
Lo (10) Patent No.: US 6,834,770 B2
(45) Date of Patent: Dec. 28, 2004

(54) FUEL INLET STRUCTURE FOR VESSEL

(75) Inventor: Nico Lo, Hsinchu (TW)

(73) Assignee: Hsiang Tzer Enterprise Co., Ltd., Hsinchu (TW)

( * ) Notice: Subject to any disclaimer, the term of this patent is extended or adjusted under 35 U.S.C. 154(b) by 115 days.

(21) Appl. No.: 10/372,856

(22) Filed: Feb. 26, 2003

(65) Prior Publication Data

US 2004/0163728 A1 Aug. 26, 2004

(51) Int. Cl.$^7$ .............................................. B65D 39/00
(52) U.S. Cl. ................... 220/212.5; 220/255; 220/801; 220/762; 220/86.1; 220/DIG. 33; 138/89
(58) Field of Search ...................... 220/DIG. 33, 86.1, 220/86.2, 212.5, 210, 233, 284, 801, 802, 757, 762–764, 255; 138/89; 215/355, 364, 296, 305

(56) References Cited

U.S. PATENT DOCUMENTS

| | | | | |
|---|---|---|---|---|
| 4,930,657 A | * | 6/1990 | Walker | 220/235 |
| 5,285,917 A | * | 2/1994 | Hoffmann | 220/212.5 |
| 5,385,256 A | * | 1/1995 | Brown | 220/DIG. 33 |
| 5,692,542 A | * | 12/1997 | Smith | 138/89 |
| 6,209,585 B1 | * | 4/2001 | Lin | 138/89 |
| 6,209,745 B1 | * | 4/2001 | Jansson | 220/DIG. 33 |
| 6,648,160 B2 | * | 11/2003 | Hotch | 220/DIG. 33 |

* cited by examiner

Primary Examiner—Nathan J. Newhouse
(74) Attorney, Agent, or Firm—Rosenberg, Klein & Lee (57) ABSTRACT

A fuel inlet structure is disclosed to include a hollow cylindrical casing for mounting in the deck of a vessel, a plug adapted to close the casing, a movable handle supported on a spring inside the plug and vertically movable between an extended operative position for pulling by hand to remote the plug from the casing and a received non-operative position maintained in flush with the top of the plug and deck of the vessel, and a coupling member fixedly fastened to the movable handle and coupled to a track at a vertical locating plate inside the plug body and adapted to guide movement of the movable handle along the track and to selectively lock the movable handle between the extended operative position and the received non-operative position.

8 Claims, 10 Drawing Sheets

FUEL INLET STRUCTURE FOR VESSEL

BACKGROUND OF THE INVENTION

1. Field of the Invention

The present invention relates to a fuel inlet structure for mounting in the deck of a vessel to control the filling hole of the fuel tank of the vessel and, more particularly, to such a fuel inlet structure that can conveniently be closed and opened by hand without tools.

2. Description of the Related Art

Figure 1:
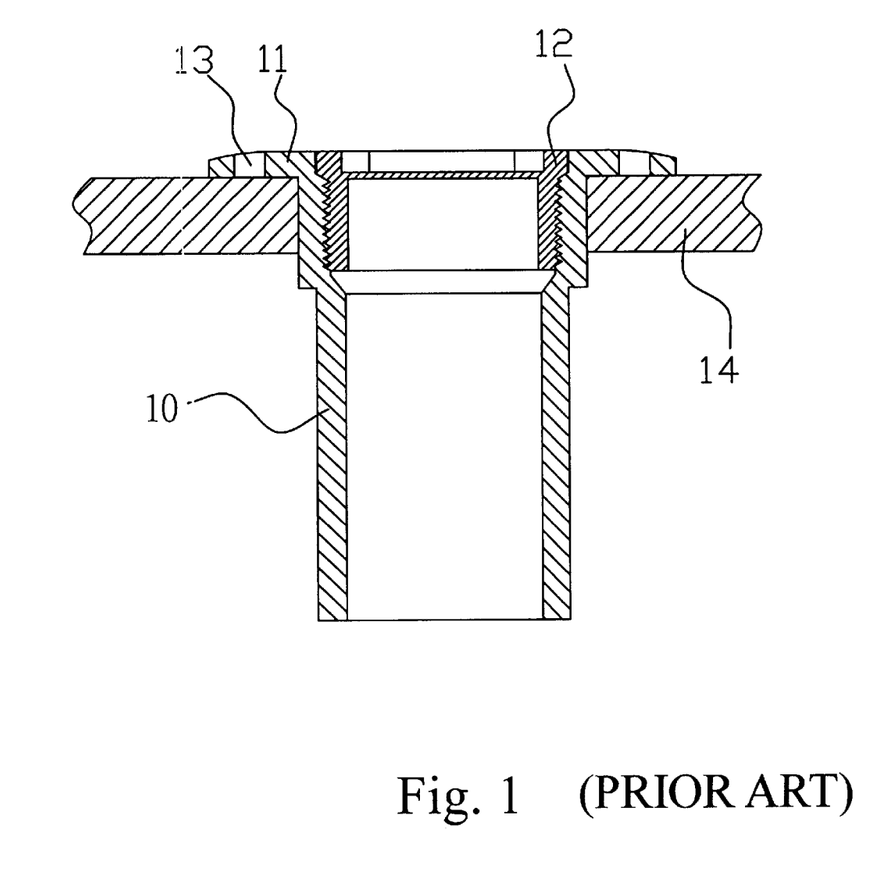
FIG. 1 is a sectional view showing a fuel inlet structure installed in the deck of a vessel according to the prior art.
Figure 2:
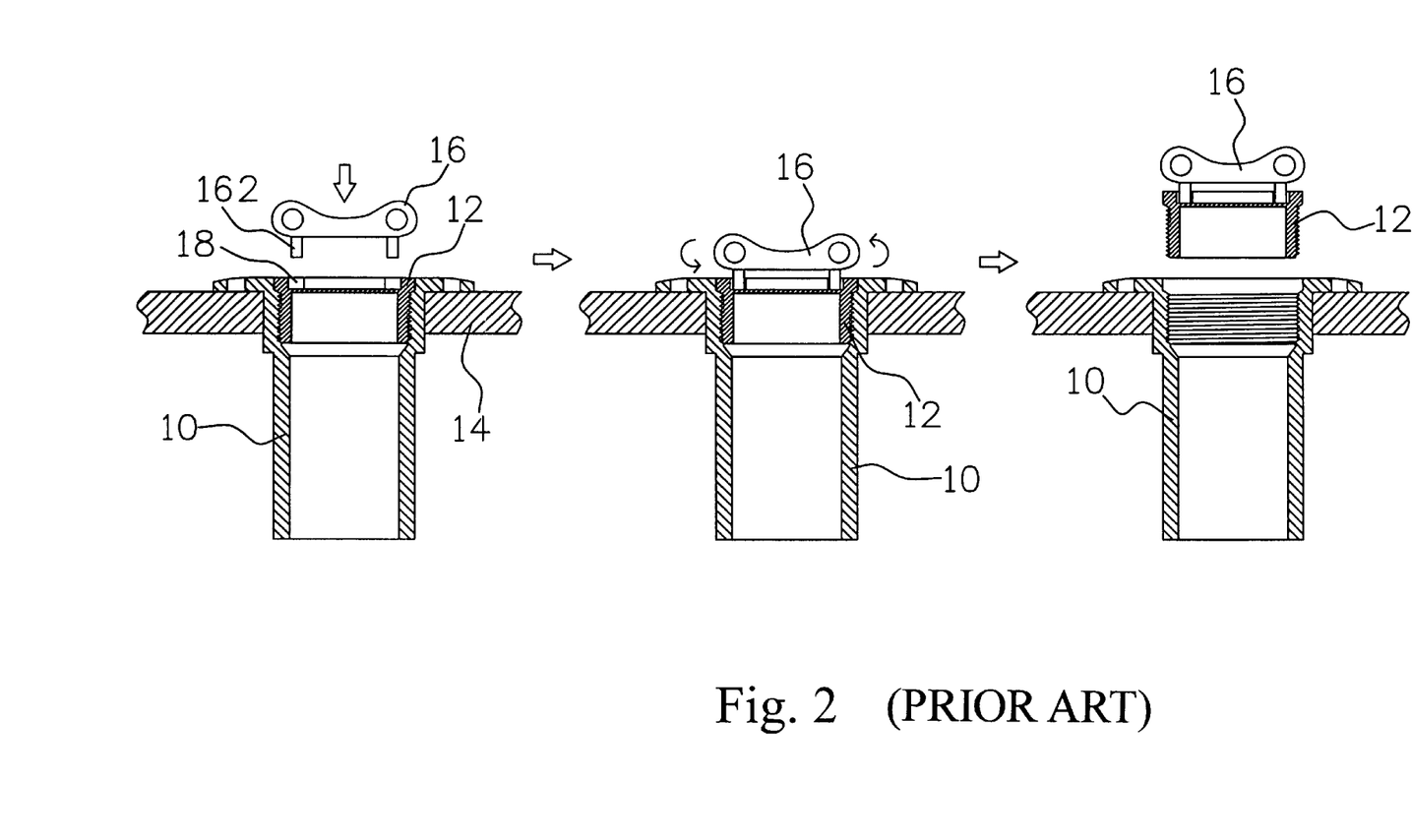
FIG. 2 is a continuous series of drawings showing the opening of the screw cap from the metal casing with a driving tool according to the prior art.

FIG. 1 illustrates a fuel inlet structure for vessel according to the prior art. According to this design, the fuel inlet structure comprises a hollow cylindrical metal casing 10 and a screw cap 12 threaded into the top side of the metal casing 10 to close the passage. The metal casing 10 has an annular top flange 11 and three screw holes 13 equiangularly spaced in the annular top flange 11. During installation, the metal casing 10 is inserted into a hole in the deck 14, and tie screws (not shown) are driven through the screw holes 13 into the deck 14 to fixedly secure the metal casing 10 to the deck 14. Because the fuel inlet structure is mounted in the deck 14 of the vessel, the top side of the fuel inlet structure must be maintained smooth so that people do not trip on the screw cap 12 of the fuel inlet structure. Therefore, a driving tool must be used when opening the screw cap 12. As illustrated in FIG. 2, the driving tool is a substantially Π-shaped member having a transversely extended handle 16 and two driving rods 162 vertically downwardly extended from two ends of the handle 16. Fitting the driving rods 162 into the polygonal top recess 18 of the screw cap 12 and then rotating the handle 16 with the hand remove the screw cap 12 removed from the metal casing 10. However, because the driving tool is not attached to the fuel inlet structure, it must be separately received. The worker may not be able to get the driving tool soon when wishing to open the fuel inlet structure. Further, because the tie screws fastening the metal casing 10 to the deck 14 are exposed to the weather, they tend to be covered with rust quickly.

It is therefore desirable to provide a fuel inlet structure that eliminates the aforesaid drawbacks.

SUMMARY OF THE INVENTION

The present invention has been accomplished under the circumstances in view. It is the main object of the present invention to provide a fuel inlet structure for vessel, which is maintained in flush with the deck without hindering people from passing when closed. It is another object of the present invention to provide a fuel inlet structure for vessel, which can conveniently be opened or closed by hand without tools. It is still another object of the present invention to provide a fuel inlet structure for vessel, which protects tie screws against the weather. According to one aspect of the present invention, the fuel inlet structure comprises a hollow cylindrical casing for mounting in the deck of a vessel, a plug adapted to close the casing, a movable handle supported on a spring inside the plug and vertically movable between an extended operative position for pulling by hand to remote the plug from the casing and a received non-operative position maintained in flush with the top of the plug and deck of the vessel, and a coupling member fixedly fastened to the movable handle and coupled to a track at a vertical locating plate inside the plug body and adapted to guide movement of the movable handle along the track and to selectively lock the movable handle between the extended operative position and the received non-operative position. According to another aspect of the present invention, the casing has a top mounting flange for fastening to the deck of the vessel by tie screws, and the plug has a cover plate fitting over the top mounting flange to keep the tie screws from the effect of the weather.

BRIEF DESCRIPTION OF THE DRAWINGS

FIGS. 9(a)~9(g) are continuous drawings explaining the action of the coupling block relative to the track of the locating plate when the movable handle moved from the received non-operative position to the extended operative position.

FIGS. 10(a)~(e) are continuous drawings explaining the action of the coupling block relative to the track of the locating plate when the movable handle moved from the extended operative position to the received non-operative position.

DETAILED DESCRIPTION OF THE PREFERRED EMBODIMENT

Figure 3:
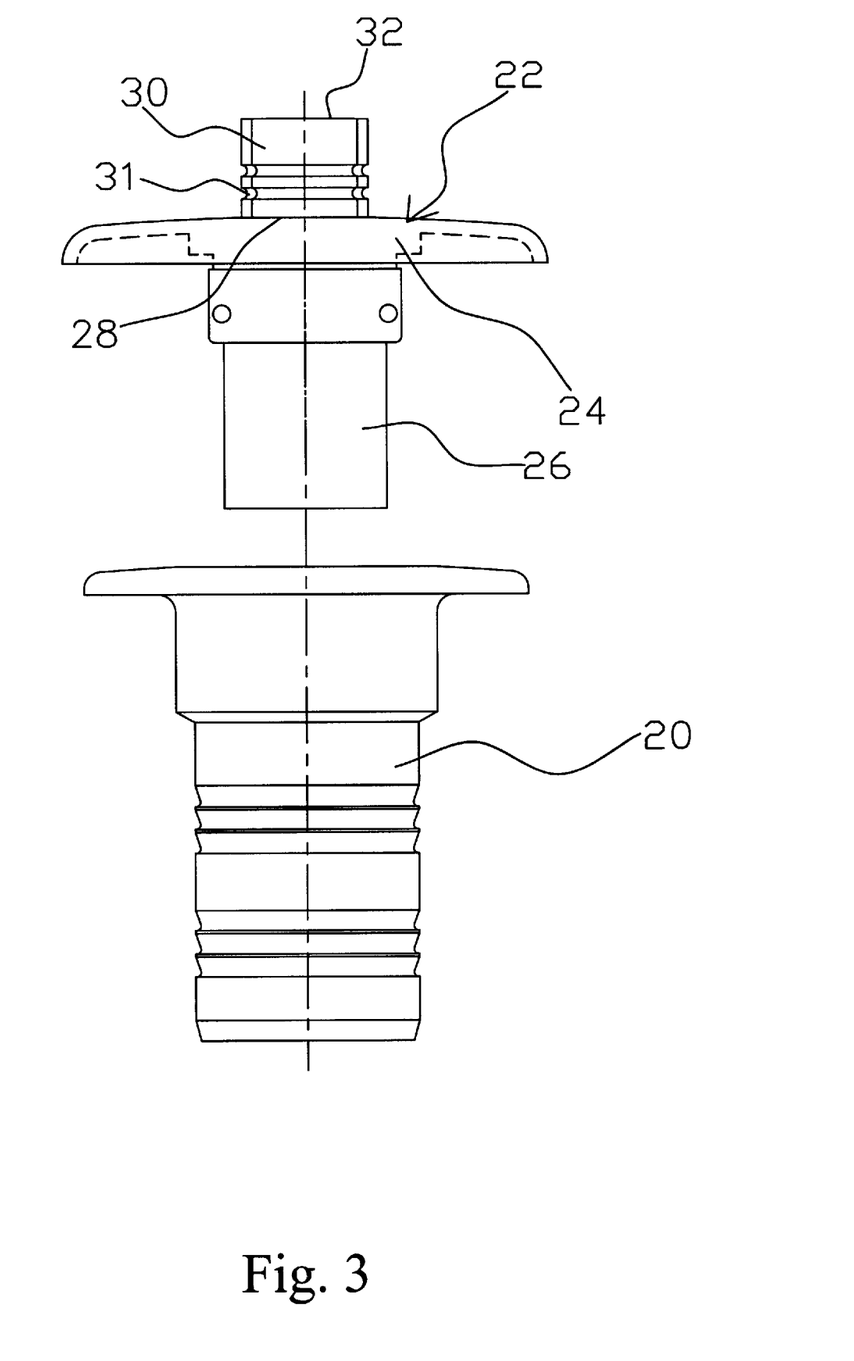
FIG. 3 is an exploded view of a fuel inlet structure according to the present invention.
Figure 4:
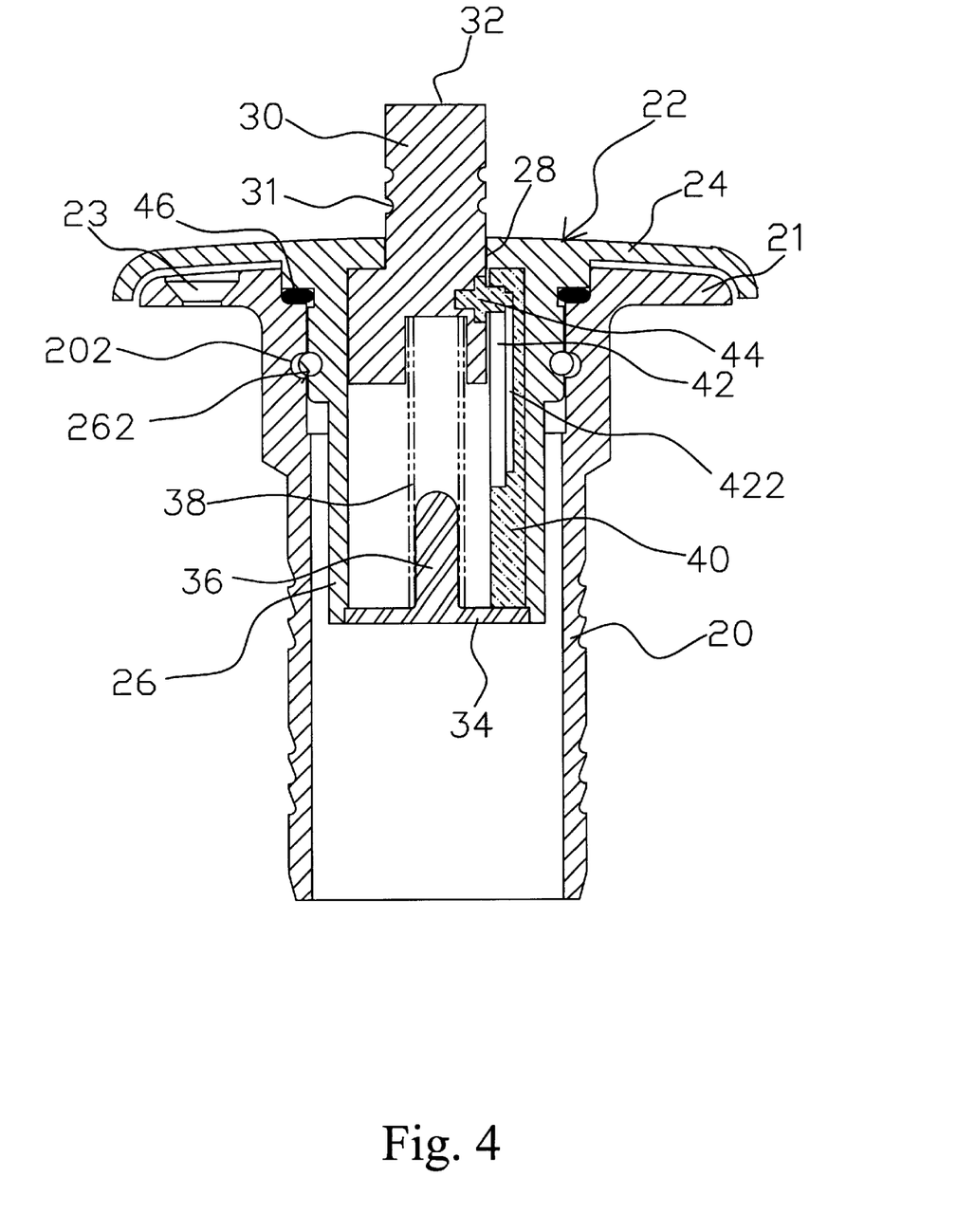
FIG. 4 is a sectional assembly view of the fuel inlet structure according to the present invention, showing the movable handle extended out of the plug.
Figure 5:
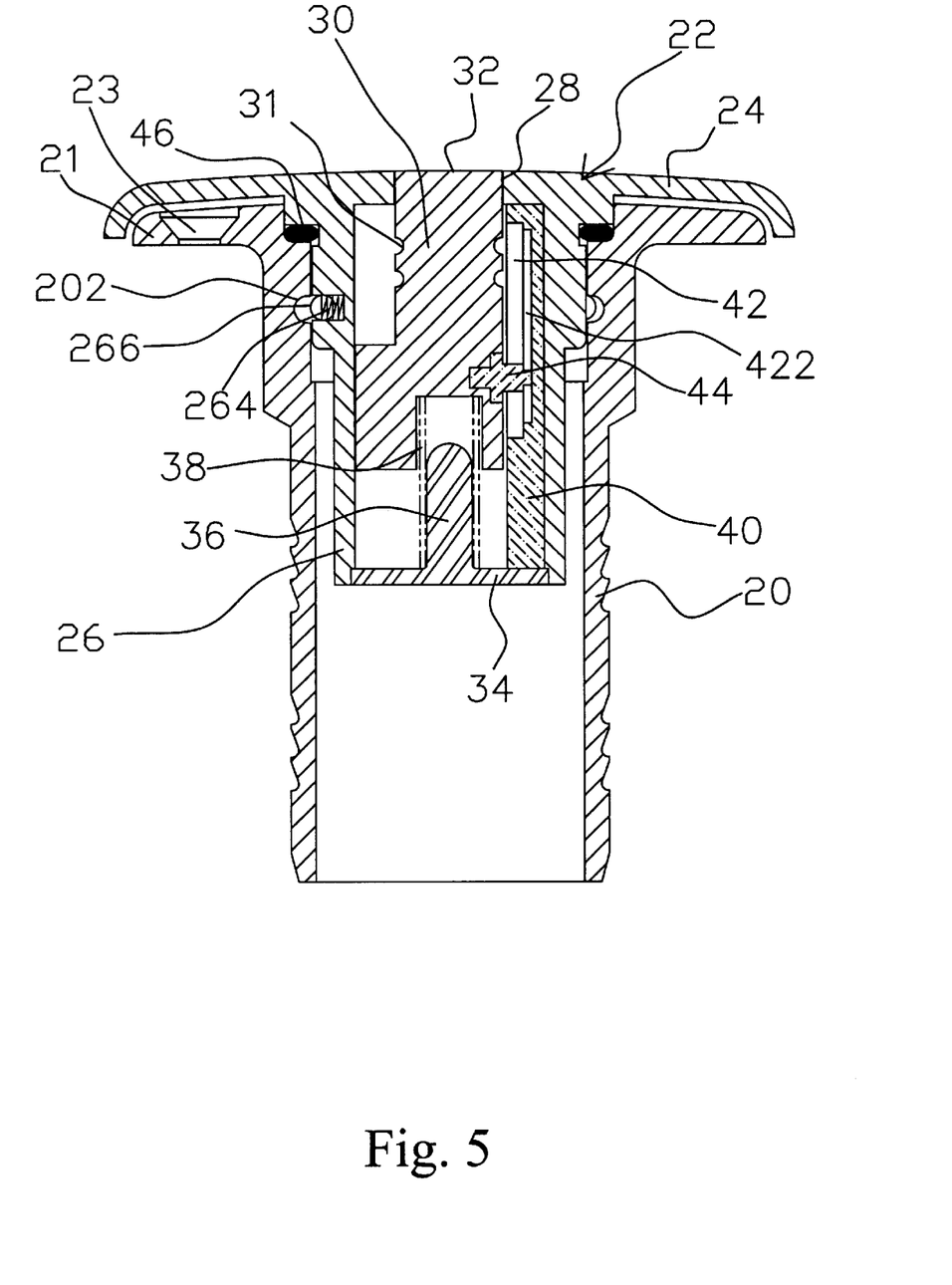
FIG. 5 another sectional view of the present invention, showing the movable handle received inside the plug.
Figure 6:
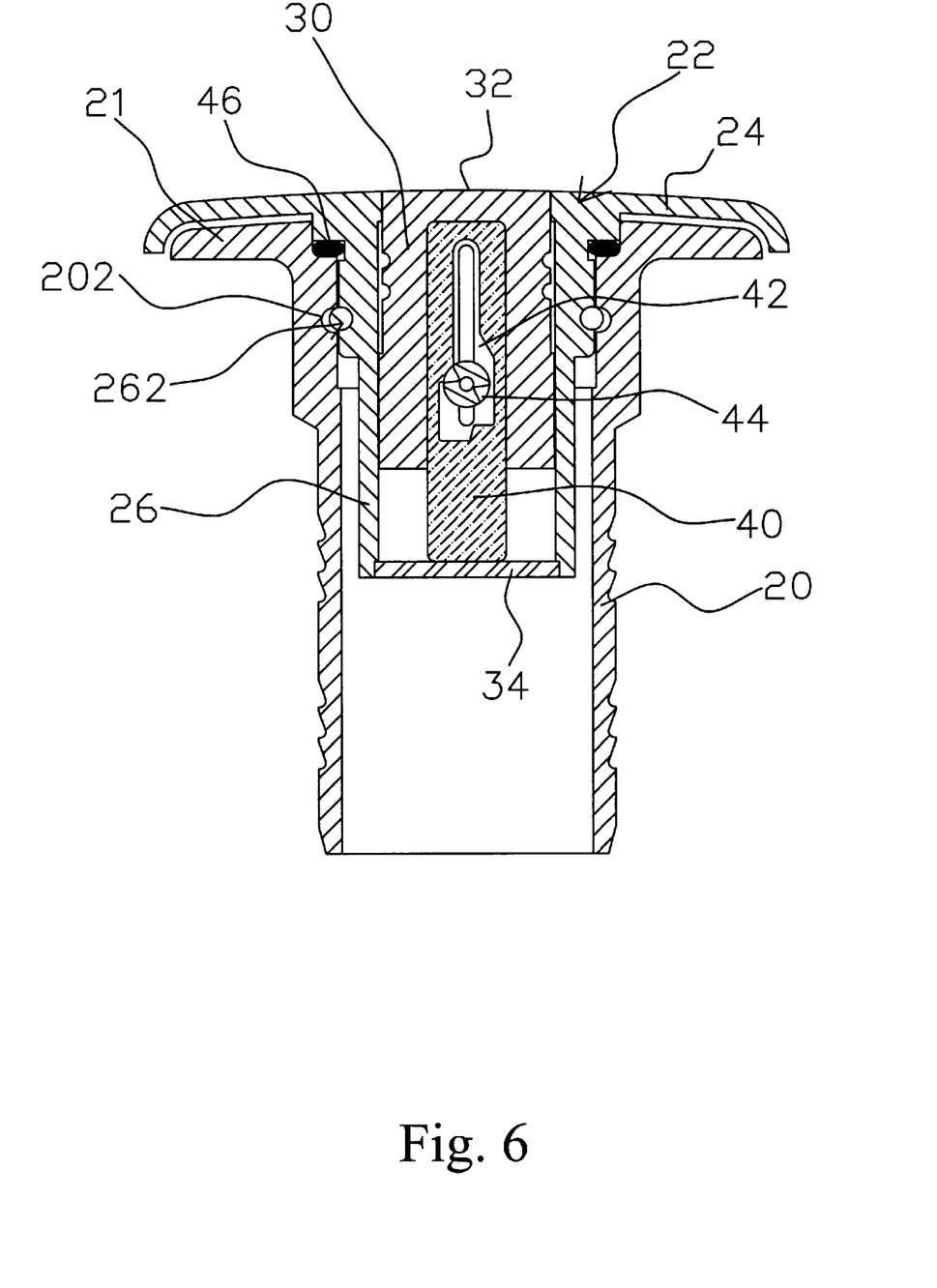
FIG. 6 is a sectional view of FIG. 5 when rotated horizontally through 90°.

Referring to FIGS. 3~5, a fuel inlet structure is shown comprised of a hollow cylindrical casing 20, a plug 22 adapted to close the casing 20, and a gasket ring 46 mounted on the plug 22 and adapted to seal the gap between the casing 20 and the plug 22. The casing 20 has a top mounting flange 21 and a plurality of screw holes 23 equiangularly spaced in the top mounting flange 21 for mounting. The plug 22 comprises a horizontal cover plate 24 fitting over the top mounting flange 21 of the casing 20, a center hole 28 at the center of the cover plate 24, a hollow cylindrical plug body 26 perpendicularly downwardly extended from the bottom side of the cover plate 24 around the center hole 28. The plug body 26 has a horizontal bottom wall 34 and an upright inside rod 36 vertically upwardly extended from the horizontal bottom wall 34. Further, the casing 20 has an inside annular groove 202 extended around the inside wall. A plurality of, for example, three retainers 262 are equiangularly provided at the periphery of the plug body 26 and adapted to secure the plug body 26 to the inside annular groove 202 of the casing 20. As illustrated in FIG. 5, each retainer 262 comprises a compression spring 264 mounted in (a respective blind hole of) the periphery of the plug body 26, and a steel ball 266 supported on the compression spring 264 and partially forced out of the periphery of the plug body 26 by the compression spring 264. After insertion of the plug body 26 into the casing 20, the steel balls 266 of the retainers 262 are forced by the respective compression springs 264 into engagement with the inside annular groove 202.

A movable handle 30 is mounted in the plug body 26 and vertically movable between a received non-operative position where the movable handle 30 is received inside the plug body 26 and maintained in flush with the top surface of the cover plate 24 (see FIG. 5), and an extended operative position where the movable handle 30 has a part extended out of the center hole 28 for gripping by hand (see FIG. 5). A compression spring 38 is mounted on the upright inside rod 36 to support the handle 30 in the extended operative position (the position shown in FIG. 4). The movable handle 30 is stopped inside the plug body 26, having a top grip 32 of reduced diameter insertable through the center hole 28. The top grip 32 has grooves 31 around the periphery so that the user can hold the top grip 32 firmly with the hand.

Figure 7:
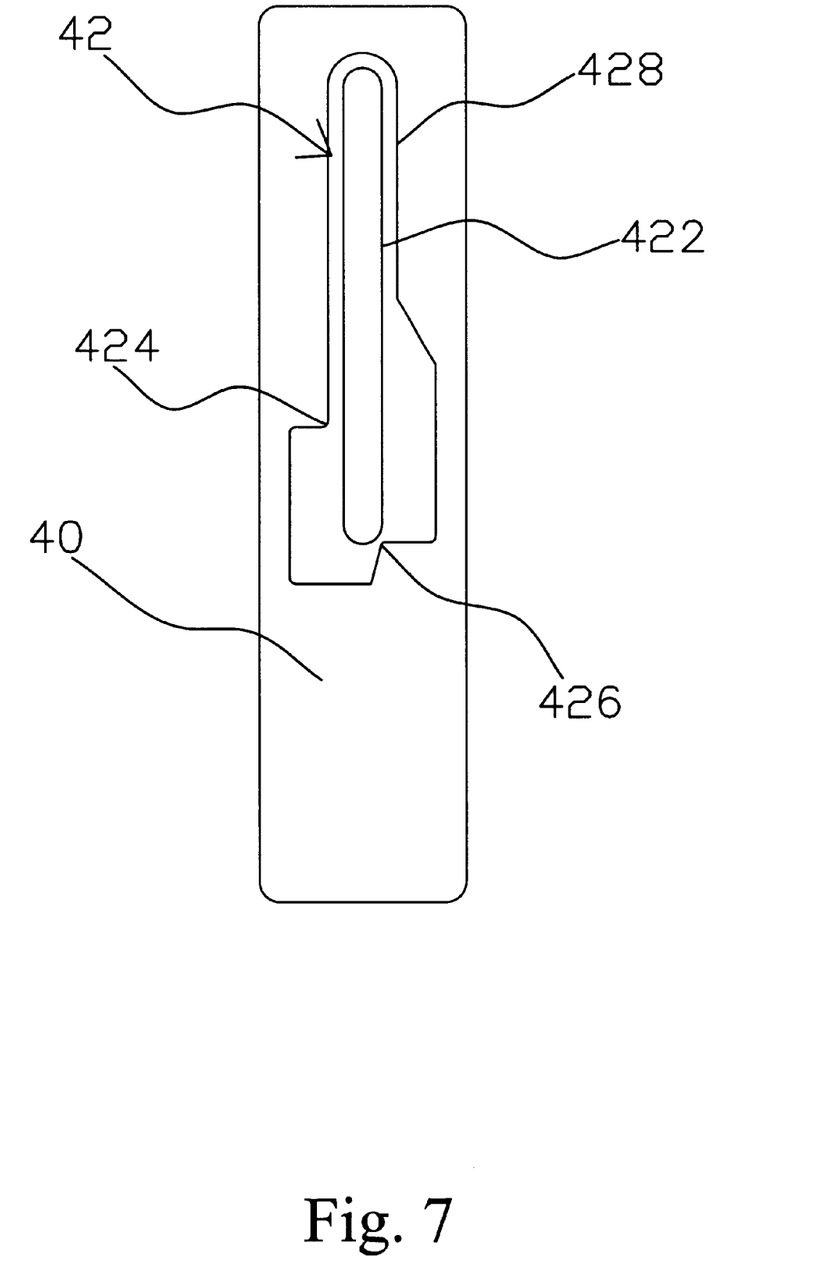
FIG. 7 is a plain view of the locating plate for the fuel inlet structure according to the present invention.
Figure 8:
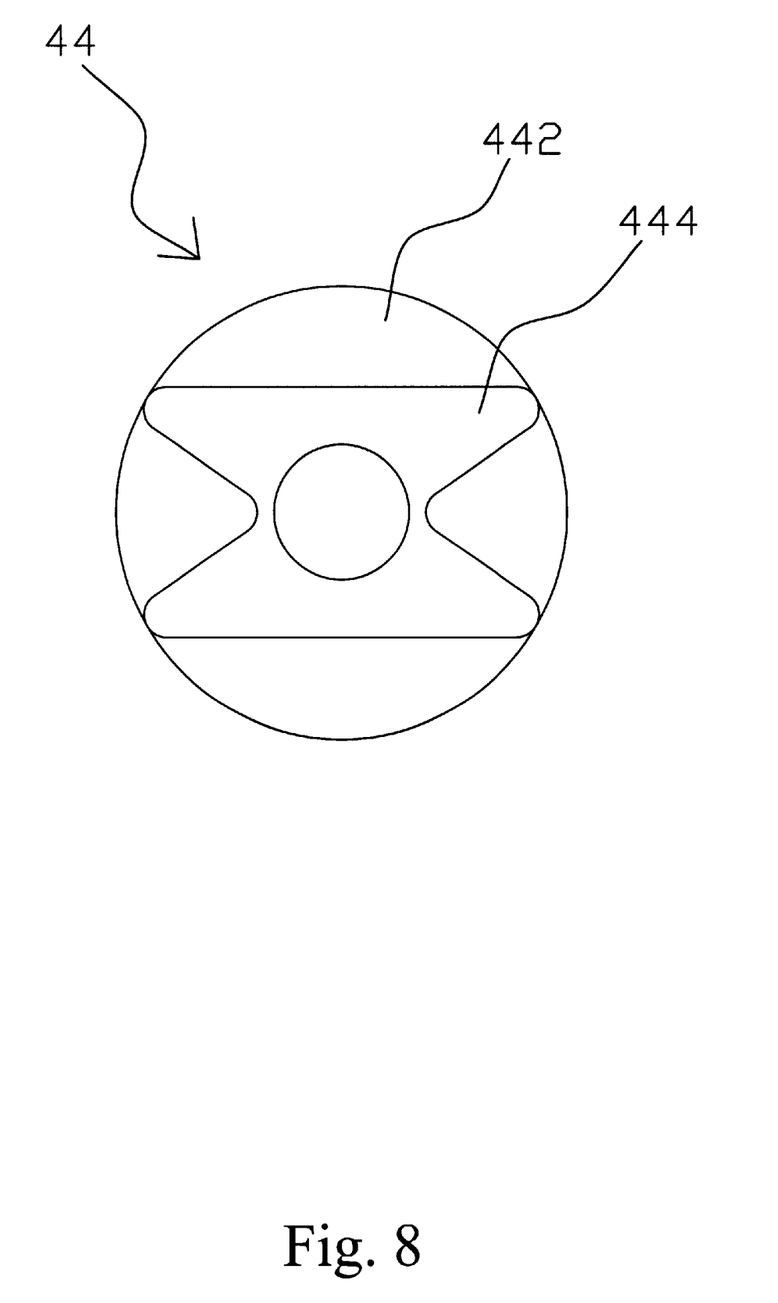
FIG. 8 is a plain view of the coupling block for the fuel inlet structure according to the present invention.

Referring to FIGS. 6~8 and FIGS. 3~5 again, a locating plate 40 is fixedly vertically mounted in the plug body 26 at one side, defining a longitudinal track 42. As illustrated in FIG. 7, the track 42 comprises a longitudinally extended deep groove 422, and a shadow groove, which is formed of an invertedly disposed U-shaped upper positioning section 428 corresponding to the upper part of the center groove 422, a substantially V-shaped lower positioning section 424 downwardly extended from one end of the upper positioning section 428 corresponding to the left side of the lower part of the center groove 422, and a substantially V-shaped lower guide section 426 upwardly extended from one end of the lower positioning section 424 corresponding to the right side of the lower part of the center groove 422 and connected to the other end of the upper positioning section 428. A coupling member 44 is fixedly fastened to one side of the movable handle 30, comprising a guide disk 442 coupled to the center groove 422 of the track 42 and adapted to guide vertical movement of the movable handle 30 along the track 42, and a butterfly control block 444 fastened pivotally with the guide disk 442 and adapted to control movement and positioning of the coupling member 44 in the track 42. The butterfly control block 444 can be moved vertically along the center groove 422 only when the two opposite long sides of the butterfly control block 444 maintained in parallel to the upper positioning section 428. When the user pressed the movable handle 30 downwards from the extended operative position shown in FIG. 4 to the received non-operative position shown in FIG. 5, the butterfly control block 444 is stopped in the lower positioning section 424 to hold the movable handle 30 in the received non-operative position. When the user pressed the movable handle 30 again, the butterfly control block 444 is disengaged from the lower positioning section 424 and moved along the lower guide section 426 into the upper positioning section 428 (due to the upward pressure from the compression spring 38) to hold the movable handle 30 in the extended operative position.

Figure 9:
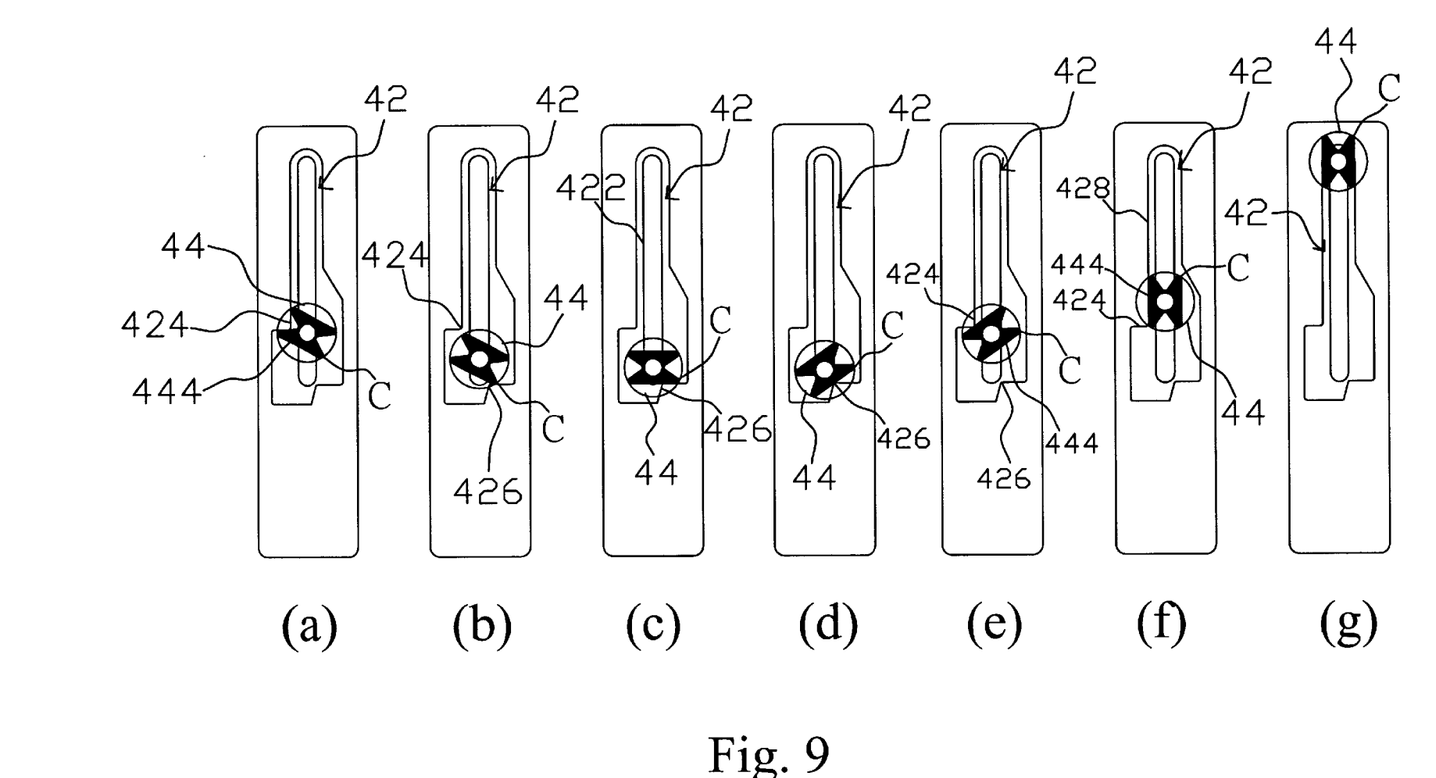

Referring to FIGS. from 9(a)~9(g), normally the movable handle 30 is received inside the plug 22. At this time, as shown in FIG. 9(a), the butterfly control block 444 is stopped in the lower positioning section 424 to hold the coupling block 44 in the lower positioning section 424. When wishing to fill fuel, press the movable handle 30 downwards with the hand. At this time, as shown in FIG. 9(b), the point C of the butterfly control block 444 is forced into contact with a part of the lower guide section 426, thereby causing the butterfly control block 444 to be rotated counter-clockwise to the status shown in FIG. 9(c). When continuously pressing the movable handle 30, the coupling block 44 is moved to the bottom end of the center groove 422. At this time, the butterfly control block 444 is forced against a part of the lower guide section 426 to rotate counter-clockwise continuously to the status shown in FIG. 9(d). When released the hand from the movable handle 30 at this time, the compression spring 38 forces the movable handle 30 vertically upwards as shown in FIG. 9(e), and the butterfly control block 444 is forced against a part of the lower positioning section 424 to rotate counter-clockwise continuously to the status shown in FIG. 9(f), enabling the coupling block 44 to be moved to the top end of the track 42 as shown in FIG. 9(g). At this time, the top grip 32 of the movable handle 30 is extended out of the center hole 28 of the plug 22 (see FIG. 4), and the user can pull the plug 22 with the hand to disconnect the plug 22 from the casing 20.

Figure 10:
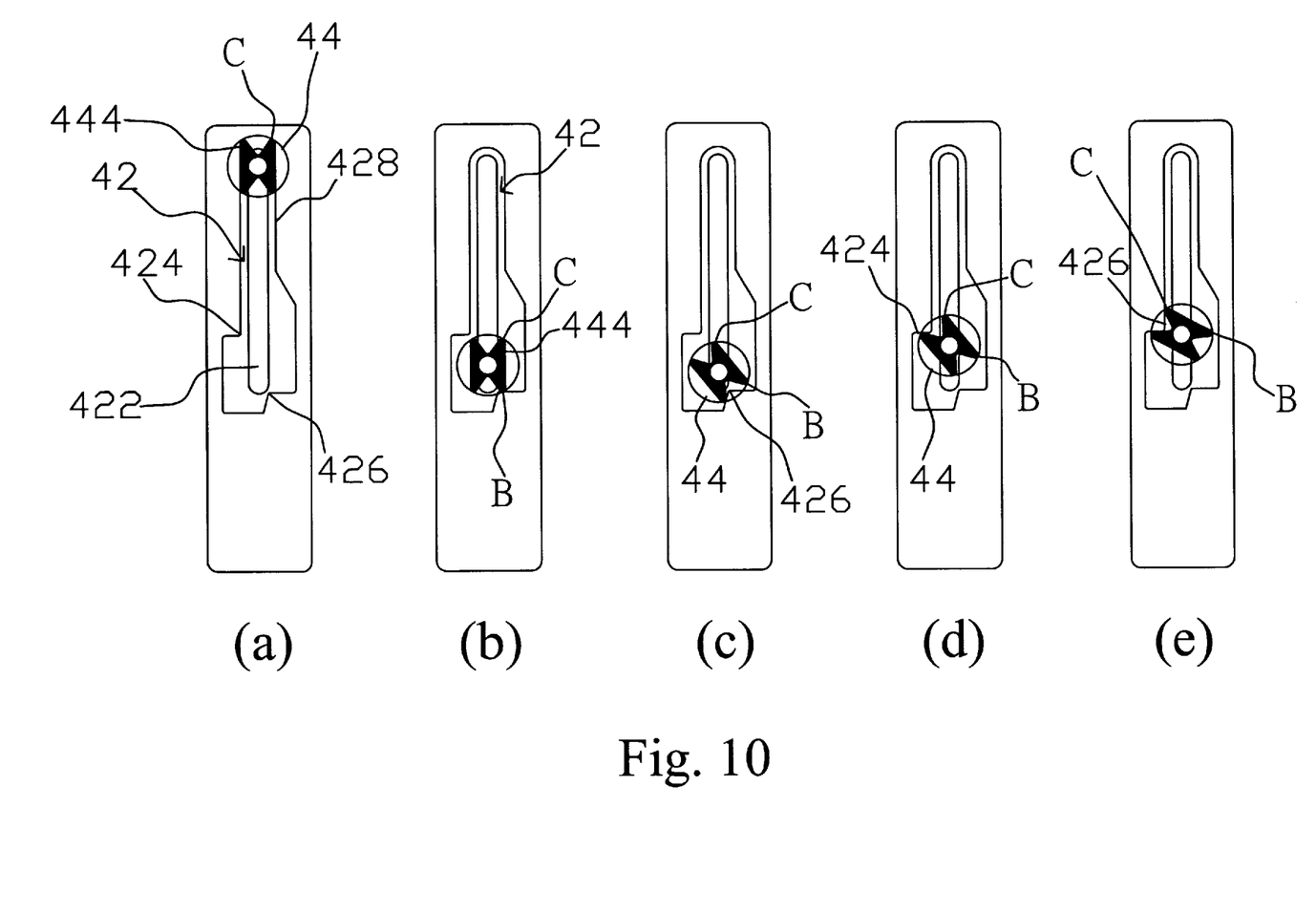

After filling of fuel, the plug 22 is inserted into the casing 20 to force the retainers 262 into engagement with the inside annular groove 202 of the casing 20, and then the movable handle 30 is forced downwards. During downward stroke of the movable handle 30, the coupling block 44 is moved from the upper limit position as shown in FIG. 10(a) toward the position shown in FIG. 10(b). When reached the position shown in FIG. 10(b), the point B of the butterfly control block 444 is forced against a part of the lower guide section 426, thereby causing the butterfly control block 444 to rotate counter-clockwise as shown in FIG. 10(c). When released the hand from the movable handle 30 at this time, the compression spring 38 immediately forces the movable handle 30 upwards, thereby causing the butterfly control block 444 to be forced against a part of the lower positioning section 424 as shown in FIG. 10(d) and then rotated counter-clockwise till the point C is stopped at the lower positioning section 424 as shown in FIG. 10(e), and therefore the movable handle 30 is locked in the received non-operative position as shown in FIG. 5.

A prototype of fuel inlet structure for vessel has been constructed with the features of FIGS. 1~10. The fuel inlet structure for vessel functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A fuel inlet structure comprising:
   a hollow cylindrical casing;
   a plug adapted to close said casing, said plug comprising a horizontal cover plate fitting over said casing, a center hole at the center of said cover plate, and a hollow cylindrical plug body perpendicularly downwardly extended from a bottom side of said cover plate around said center hole, said plug body having a horizontal bottom wall;
   a movable handle mounted in said plug body and vertically movable between a received non-operative position where said movable handle is received inside said plug body and maintained in flush with a top surface of said cover plate, and an extended operative position where said movable handle has a part extended out of said center hole of said plug for gripping by hand to remove said plug from said casing;
   spring means mounted on the bottom wall of said plug body to support said movable handle in said extended operative position
   a locating plate fixedly vertically mounted in said plug body at one side, said locating plate defining a longitudinal track, said track comprising a longitudinally extended deep groove, and a shadow groove, said shadow groove comprising an invertedly disposed U-shaped upper positioning section corresponding to an upper part of said center groove, a substantially V-shaped lower positioning section downwardly extended from one end of said upper positioning section corresponding to a left lower part of said center groove, and a substantially V-shaped lower guide section upwardly extended from one end of said lower positioning section corresponding to a right lower part of said center groove and connected to one end of said upper positioning section opposite to said lower positioning section; and a coupling member fixedly fastened to one side of said movable handle and adapted to guide movement of said movable handle along said track and to selectively lock said movable handle between said extended operative position and said received non-operative position, said coupling member comprising a guide disk coupled to the center groove of said track and adapted to guide vertical movement of said movable handle along said track, and a butterfly control block fastened pivotally with said guide disk and adapted to control positioning of said coupling member in said track;

wherein when the user pressed said movable handle downwards from said extended operative position toward said received non-operative position, said butterfly control block is stopped in said lower positioning section to lock said movable handle in said received non-operative position; when the user pressed said movable handle again, said butterfly control block is disengaged from said lower positioning section and moved along said lower guide section into said upper positioning section to lock said movable handle in said extended operative position.

2. The fuel inlet structure as claimed in claim 1, wherein said plug body comprises an upright inside rod vertically upwardly extended from said bottom wall and adapted to hold said spring means against said movable handle.

3. The fuel inlet structure as claimed in claim 1, wherein said spring means is a compression spring.

4. The fuel inlet structure as claimed in claim 1, wherein said casing comprises at least one inside groove; said plug body comprises at least one retainer means in the periphery thereof, said at least one retainer means being engaged into the at least one side groove of said casing when said plug body inserted into said casing.

5. The fuel inlet structure as claimed in claim 4, wherein said at least one retainer means each is comprised of a compression spring mounted in the periphery of said plug body and a steel ball supported on the compression spring and partially forced out of the periphery of said plug body.

6. The fuel inlet structure as claimed in claim 1, further comprising a gasket ring mounted on the periphery of said plug body and adapted to seal the gap between said casing and said plug.

7. The fuel inlet structure as claimed in claim 1, wherein said cover plate and said plug body of said plug are formed integral with each other.

8. The fuel inlet structure as claimed in claim 1, wherein said movable handle has a top grip insertable through the center hole of said plug, said top grip having grooves around the periphery thereof.

* * * * *